United States Patent
Kim et al.

(10) Patent No.: US 10,982,147 B2
(45) Date of Patent: Apr. 20, 2021

(54) LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM USING SAME

(71) Applicant: LG CHEM, LTD., Seoul (KR)

(72) Inventors: Seongku Kim, Daejeon (KR); Hee Han, Daejeon (KR); Jung Ho Jo, Daejeon (KR); Sung Joon Min, Daejeon (KR); Sang Mi Lee, Daejeon (KR); Soon Ho Kwon, Daejeon (KR); Jun Young Yoon, Daejeon (KR); Hyeong Seuk Yun, Daejeon (KR); Hoonseo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 89 days.

(21) Appl. No.: 16/333,840

(22) PCT Filed: Aug. 9, 2018

(86) PCT No.: PCT/KR2018/009116
§ 371 (c)(1),
(2) Date: Mar. 15, 2019

(87) PCT Pub. No.: WO2019/050175
PCT Pub. Date: Mar. 14, 2019

(65) Prior Publication Data
US 2019/0256778 A1    Aug. 22, 2019

(30) Foreign Application Priority Data
Sep. 7, 2017    (KR) .................. 10-2017-0114783

(51) Int. Cl.
| | | |
|---|---|---|
| C09K 19/56 | (2006.01) | |
| C08K 5/29 | (2006.01) | |
| C08G 73/10 | (2006.01) | |
| C08J 5/18 | (2006.01) | |
| C08L 79/08 | (2006.01) | |
| G02F 1/1337 | (2006.01) | |

(52) U.S. Cl.
CPC .............. *C09K 19/56* (2013.01); *C08G 73/10* (2013.01); *C08J 5/18* (2013.01); *C08K 5/29* (2013.01); *C08L 79/08* (2013.01); *G02F 1/1337* (2013.01); *C09K 2323/00* (2020.08); *C09K 2323/02* (2020.08); *C09K 2323/027* (2020.08); *G02F 1/133723* (2013.01); *G02F 2202/022* (2013.01)

(58) Field of Classification Search
CPC ............... C09K 19/56; C09K 2323/00; C09K 2323/02; C09K 2323/027; C08K 5/29; C08L 79/08; G02F 1/1337; G02F 1/133723; G02F 2202/022; Y10T 428/10; Y10T 428/1023; Y10T 428/1005; C08G 73/10; C08G 73/1085; C08G 73/0178

USPC ......... 428/1.1, 1.2, 1.26; 349/123, 127, 130, 349/132
See application file for complete search history.

(56) References Cited

U.S. PATENT DOCUMENTS

| | | |
|---|---|---|
| 2009/0053430 A1 | 2/2009 | Matsumori et al. |
| 2015/0045481 A1 | 2/2015 | Kim et al. |
| 2015/0241737 A1 | 8/2015 | Jang et al. |
| 2016/0266441 A1 | 9/2016 | Jung et al. |
| 2017/0152443 A1 | 6/2017 | Chiou |
| 2017/0307781 A1 | 10/2017 | Lee et al. |

FOREIGN PATENT DOCUMENTS

| | | |
|---|---|---|
| CN | 107075116 A | 8/2017 |
| EP | 3196228 A1 | 7/2017 |
| JP | H06-235922 A | 8/1994 |
| JP | 09-185063 A | 7/1997 |
| JP | H10-095845 A | 4/1998 |
| JP | H11-030779 A | 2/1999 |
| JP | 2002-020754 A | 1/2002 |
| JP | 2011-039258 A | 2/2011 |
| JP | 2012-150251 A | 8/2012 |
| JP | 5150409 B2 | 2/2013 |
| JP | 2015-215591 A | 12/2015 |
| JP | 2016-029465 A | 3/2016 |
| JP | 2017-083660 A | 5/2017 |
| KR | 10-2011-0088394 A | 8/2011 |
| KR | 10-2011-0119793 A | 11/2011 |
| KR | 10-2012-0084253 A | 7/2012 |
| KR | 10-2013-0079141 A | 7/2013 |
| KR | 10-2013-0103023 A | 9/2013 |
| KR | 10-2014-0027550 A | 3/2014 |
| KR | 10-2014-0034082 A | 3/2014 |
| KR | 10-1415544 B1 | 7/2014 |
| KR | 10-2014-0124833 A | 10/2014 |
| KR | 10-2016-0038817 A | 4/2016 |
| KR | 10-2016-0068764 A | 6/2016 |
| KR | 10-2016-0110668 A | 9/2016 |
| KR | 10-2017-0030045 A | 3/2017 |
| KR | 10-2017-0056654 A | 5/2017 |
| KR | 10-2017-0072930 A | 6/2017 |
| KR | 10-2018-0127892 A | 11/2018 |
| TW | 201144384 A1 | 12/2011 |
| TW | 201231505 A | 8/2012 |

OTHER PUBLICATIONS

International Search Report issued for International Patent Application No. PCT/KR2018/009116 dated Nov. 28, 2018, 9 pages.

(Continued)

*Primary Examiner* — Ruiyun Zhang
(74) *Attorney, Agent, or Firm* — Rothwell, Figg, Ernst & Manbeck, P.C.

(57) ABSTRACT

The present invention relates to a liquid crystal aligning agent composition for forming a liquid crystal alignment film exhibiting excellent alignment and electrical characteristics and simultaneously having excellent film strength, a method for preparing a liquid crystal alignment film using the same, and a liquid crystal alignment film and a liquid crystal display device using the same.

18 Claims, No Drawings

(56) References Cited

OTHER PUBLICATIONS

Qingbin Xue, et al., "Synthesis and lyotropic liquid crystal properties of chiral helical polycarbodiimides", Liquid Crystals, vol. 31, No. 2, Feb. 2004, 137-143.
International Search Report issued for International Patent Application No. PCT/KR2018/009114 dated Jan. 17, 2019, 9 pages.

LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM USING SAME

CROSS-REFERENCE TO RELATED APPLICATION(S)

This application is a 35 U.S.C. § 371 National Phase Entry Application from PCT/KR2018/009116, filed on Aug. 9, 2018, and designating the United States, which claims priority to and the benefit of Korean Patent Application No. 10-2017-0114783 filed with the Korean Intellectual Property Office on Sep. 7, 2017, the disclosures of which are incorporated herein by reference in their entirety.

TECHNICAL FIELD

The present invention relates to a liquid crystal aligning agent composition for forming a liquid crystal alignment film exhibiting excellent alignment and electrical characteristics and simultaneously having excellent film strength, a method for preparing a liquid crystal alignment film using the same, and a liquid crystal alignment film and a liquid crystal display device using the same.

BACKGROUND ART

In a liquid crystal display device, a liquid crystal alignment film plays a role of aligning liquid crystals in a certain direction. Specifically, a liquid crystal alignment film serves as a director in the arrangement of liquid crystal molecules, and thus, when the liquid crystals are moved due to an electric field to form an image, it helps them to orient in an appropriate direction. Further, in order to obtain uniform brightness and a high contrast ratio in a liquid crystal display device, it is essential to uniformly align the liquid crystals.

As one of the conventional methods for aligning a liquid crystal, a rubbing method of coating a polymer film such as a polyimide onto a substrate such as glass and rubbing the surface thereof in a predetermined direction using fibers such as nylon or polyester has been used. However, the rubbing method may cause serious problems during manufacture of a liquid crystal panel because fine dust or electrostatic discharge (ESD) may occur when the fiber and polymer film are rubbed.

In order to solve the problems of the rubbing method, a photo-alignment method of inducing anisotropy of polymer films by light irradiation rather than the rubbing, and aligning liquid crystals using the anisotropy, has been studied recently.

As materials that can be used for the photo-alignment method, various materials have been introduced, among which a polyimide is mainly used for various superior performances of liquid crystal alignment films. However, the polyimide is poor in solubility in a solvent, so it is difficult to apply it directly to a manufacturing process of forming an alignment film by coating in a solution state.

Accordingly, after coating in the form of a precursor such as a polyamic acid or a polyamic acid ester having excellent solubility, a heat treatment process is performed at a temperature of 200° C. to 230° C. to form a polyimide, which is then irradiated with light to perform an alignment treatment.

However, due to a larger size of a panel, a column space (CS)-sweeping phenomenon occurs in the manufacturing process, and haze is generated on the surface of the liquid crystal alignment film, which causes a galaxy problem. Thus, there was a limitation in that the performance of the panel cannot be sufficiently realized.

Therefore, there is a need to develop a liquid crystal aligning agent composition for preparing a liquid crystal alignment film having high film strength required in display fields.

DETAILED DESCRIPTION OF THE INVENTION

Technical Problem

It is an object of the present invention to provide a liquid crystal aligning agent composition for forming a liquid crystal alignment film exhibiting excellent alignment and electrical characteristics, and simultaneously having excellent film strength.

It is another object of the present invention to provide a method for preparing a liquid crystal alignment film using the above-described liquid crystal aligning agent composition.

It is a further object of the present invention to provide a liquid crystal alignment film prepared by the above-described preparation method, and a liquid crystal display device including the same.

Technical Solution

In order to achieve the above objects, the present invention provides a liquid crystal aligning agent composition including: (i) a polymer including a repeating unit represented by the following Chemical Formula 1 or a repeating unit represented by the following Chemical Formula 2; and (ii) a polycarbodiimide compound represented by the following Chemical Formula 5:

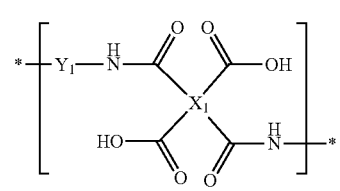

[Chemical Formula 1]

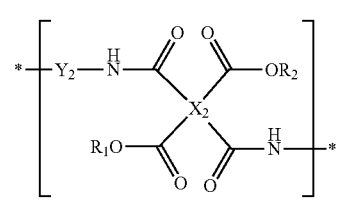

[Chemical Formula 2]

wherein, Chemical Formulas 1 and 2, at least one of $R_1$ and $R_2$ is an alkyl group having 1 to 10 carbon atoms and the other is hydrogen, $X_1$ and $X_2$ are each a tetravalent organic group represented by the following Chemical Formula 3,

[Chemical Formula 3]

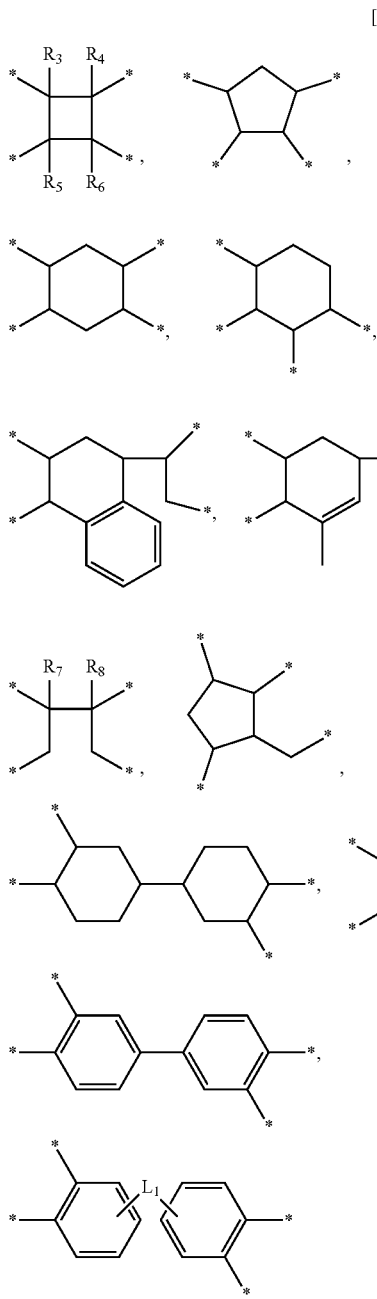

in Chemical Formula 3, $R_3$ to $R_8$ are each independently hydrogen or an alkyl group having 1 to 6 carbon atoms, $L_1$ is any one selected from a single bond, —O—, —CO—, —COO—, —S—, —SO—, —SO$_2$—, —CR$_9$R$_{10}$—, —(CH$_2$)$_Z$—, —O(CH$_2$)$_Z$O—, —COO(CH$_2$)$_Z$OCO—, —CONH—, phenylene, or a combination thereof, where $R_9$ and $R_{10}$ are each independently hydrogen, an alkyl group having 1 to 10 carbon atoms, or a fluoroalkyl group, Z is an integer of 1 to 10, $Y_1$ and $Y_2$ are each independently a divalent organic group represented by the following Chemical Formula 4,

[Chemical Formula 4]

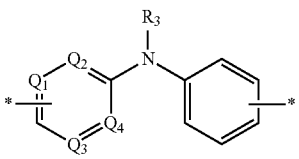

wherein, in Chemical Formula 4, at least one of $Q_1$ to $Q_4$ is a nitrogen atom and each of the rest is a carbon atom, and $R_3$ is hydrogen or an alkyl group having 1 to 6 carbon atoms,

[Chemical Formula 5]

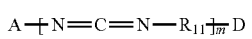

wherein, in Chemical Formula 5,

A is an organic group including —O—, —CO—, —S—, —C(CH$_3$)$_2$—, —C(CF$_3$)$_2$—, —CONH—, —COO—, —(CH$_2$)$_b$—, —O(CH$_2$)$_b$O—, —COO—(CH$_2$)$_b$—OCO—, a urethane-based functional group, or a urea-based functional group, b is an integer of 1 to 10, $R_{11}$ is an alkylene group having 1 to 20 carbon atoms or an arylene group having 6 to 20 carbon atoms, m is an integer of 1 to 5, and D is a functional group represented by the following Chemical Formula 6,

[Chemical Formula 6]

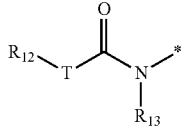

wherein, in Chemical Formula 6,

T is —O— or —NH—, $R_{12}$ is hydrogen, a halogen, an alkyl group having 1 to 6 carbon atoms, an aryl group having 6 to 20 carbon atoms, or an ether group, and $R_{13}$ is hydrogen or an alkyl group having 1 to 6 carbon atoms.

When an existing polyimide was used as a liquid crystal alignment film, a polyimide precursor having excellent solubility, such as polyamic acid or a polyamic acid ester, was coated and dried to form a coating film, which was then converted into a polyimide through a high-temperature heat treatment process, and then subjected to light irradiation or rubbing treatment to perform alignment treatment.

However, in the case of such a polyimide alignment film, since it has no chemical crosslinks between repeating units except for bonds between repeating units forming the polyimide main chain in the alignment film, there was a limitation in that the strength of the alignment film is not sufficient.

In this regard, the present inventors found through experiments that when a polycarbodiimide compound as a crosslinking agent capable of forming a chemical crosslink between internal repeating units is applied to polyamic acid or a polyamic acid ester corresponding to a polyimide precursor, not only can excellent mechanical strength be ensured through formation of a cross-linked product but also alignment and electrical characteristics equal to or higher than those of existing liquid crystal alignment films can be realized, thereby completing the present invention.

In particular, in the case of the crosslinking agent compound added to the liquid crystal aligning agent composition, through a characteristic chemical structure in which two or more carbodiimide-based functional groups are located at the terminal of an organic group A positioned at the center, as shown in Chemical Formula 5, it is possible to induce an effective crosslinking reaction between the carboxy group of the polyamic acid or the polyamic acid ester and the carbodiimide-based functional group.

Thereby, the polycarbodiimide compound can mediate chemical crosslinks between internal main chains of polyamic acid or a polyamic acid ester and can form a cross-linked structure having a relatively high degree of crosslinking, so that it is possible to have a significantly improved mechanical strength compared to existing liquid crystal alignment films.

Hereinafter, the present invention will be described in more detail.

Definition of Terms

Unless specified otherwise herein, the following terms can be defined as follows.

Throughout the specification, when one part "includes" one constituent element, unless otherwise specifically described, this does not mean that another constituent element is excluded, but means that another constituent element may be further included.

As used herein, the term "substituted" means that a hydrogen atom bonded to a carbon atom in a compound is replaced with another substituent, and a position to be substituted is not limited as long as the position is a position at which the hydrogen atom is substituted, that is, a position at which the substituent can be substituted, and when two or more are substituted, the two or more substituents may be the same as or different from each other.

As used herein, the term "substituted or unsubstituted" means being unsubstituted or substituted by one or more substituents selected from the group consisting of deuterium; a halogen group; a cyano group; a nitro group; a hydroxyl group; a carbonyl group; an ester group; an imide group; an amide group; an amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an arylphosphine group; or a heterocyclic group containing at least one of N, O, and S atoms, or being unsubstituted or substituted by a substituent to which two or more substituents are linked among the exemplified substituents. For example, "the substituent to which two or more substituents are linked" may be a biphenyl group. That is, the biphenyl group may be an aryl group, or may be interpreted as a substituent to which two phenyl groups are linked.

In the present specification, the notation

or ---* means a bond linked to another substituent group, and the direct bond means the case in which no separate atom is present at a part represented by A or B.

The hydrocarbon having 4 to 20 carbon atoms may be an alkane having 4 to 20 carbon atoms, an alkene having 4 to 20 carbon atoms, an alkyne having 4 to 20 carbon atoms, a cycloalkane having 4 to 20 carbon atoms, a cycloalkene having 4 to 20 carbon atoms, an arene having 6 to 20 carbon atoms, or a fused ring in which at least one cyclic hydrocarbon among them shares two or more atoms, or a hydrocarbon to which at least one hydrocarbon among them is chemically bonded. Specifically, examples of the hydrocarbon having 4 to 20 carbon atoms include n-butane, cyclobutane, 1-methylcyclobutane, 1,3-dimethylcyclobutane, 1,2,3,4-tetramethylcyclobutane, cyclopentane, cyclohexane, cycloheptane, cyclooctane, cyclohexene, 1-methyl-3-ethylcyclohexene, bicyclohexyl, benzene, biphenyl, diphenylmethane, 2,2-diphenylpropane, 1-ethyl-1,2,3,4-tetrahydronaphthalene, 1,6-diphenylhexane, etc.

The alkyl group having 1 to 10 carbon atoms may be a straight-chain, branched-chain, or cyclic alkyl group. Specifically, the alkyl group having 1 to 10 carbon atoms may be a straight-chain alkyl group having 1 to 10 carbon atoms; a straight-chain alkyl group having 1 to 6 carbon atoms; a branched-chain or cyclic alkyl group having 3 to 10 carbon atoms; or a branched-chain or cyclic alkyl group having 3 to 6 carbon atoms. More specifically, examples of the alkyl group having 1 to 10 carbon atoms may include a methyl group, an ethyl group, an n-propyl group, an isopropyl group, an n-butyl group, an iso-butyl group, a tert-butyl group, an n-pentyl group, an iso-pentyl group, a neo-pentyl group, a cyclohexyl group, etc.

The fluoroalkyl group having 1 to 10 carbon atoms may be a group in which at least one hydrogen in the alkyl group having 1 to 10 carbon atoms is substituted with fluorine, and the fluoroalkoxy group having 1 to 10 carbon atoms may be a group in which at least one hydrogen in the alkoxy group having 1 to 10 carbon atoms is substituted with fluorine.

The halogen may be fluorine (F), chlorine (Cl), bromine (Br), or iodine (I).

A nitrogen oxide is a compound in which a nitrogen atom and an oxygen atom are bonded, and the nitrogen oxide functional group means a functional group containing a nitrogen oxide in the functional group. As an example of the nitrogen oxide functional group, a nitro group ($-NO_2$) or the like can be used.

The alkoxy group having 1 to 10 carbon atoms may be a straight-chain, branched-chain, or cyclic alkoxy group. Specifically, the alkoxy group having 1 to 10 carbon atoms may be a straight-chain alkoxy group having 1 to 10 carbon atoms; a straight-chain alkoxy group having 1 to 5 carbon atoms; a branched-chain or cyclic alkoxy group having 3 to 10 carbon atoms; or a branched-chain or cyclic alkoxy group having 3 to 6 carbon atoms. More specifically, examples of the alkoxy group having 1 to 10 carbon atoms may include a methoxy group, an ethoxy group, an n-propoxy group, an iso-propoxy group, an n-butoxy group, an iso-butoxy group, a tert-butoxy group, an n-pentoxy group, an iso-pentoxy group, a neo-pentoxy group, a cycloheptoxy group, etc.

The alkenyl group having 1 to 10 carbon atoms may be a straight-chain, branched-chain, or cyclic alkenyl group. Specifically, the alkenyl group having 1 to 10 carbon atoms may be a straight-chain alkenyl group having 2 to 10 carbon atoms, a straight-chain alkenyl group having 2 to 5 carbon atoms, a branched-chain alkenyl group having 3 to 10 carbon atoms, a branched-chain alkenyl group having 3 to 6 carbon atoms, a cyclic alkenyl group having 5 to 10 carbon atoms, or a cyclic alkenyl group having 6 to 8 carbon atoms. More specifically, examples of the alkenyl group having 2 to 10 carbon atoms may include an ethenyl group, a propenyl group, a butenyl group, a pentenyl group, a cyclohexenyl group, etc.

In the present specification, the aryl group is not particularly limited, but preferably has 6 to 60 carbon atoms, and may be a monocyclic aryl group or a polycyclic aryl group. According to one embodiment, the aryl group has 6 to 30 carbon atoms. According to one embodiment, the aryl group has 6 to 20 carbon atoms. The aryl group may be a phenyl group, a biphenyl group, a terphenyl group, or the like as the monocyclic aryl group, but is not limited thereto. Examples of the polycyclic aryl group include a naphthyl group, an anthracenyl group, a phenanthryl group, a pyrenyl group, a perylenyl group, a chrycenyl group, a fluorenyl group, or the like, but are not limited thereto.

In the present specification, the alkylene group is a bivalent functional group derived from alkane, and may be straight-chain, branched-chain, or cyclic type, examples of which include a methylene group, an ethylene group, a propylene group, an isobutylene group, a sec-butylene group, a tert-butylene group, a pentylene group, a hexylene group, and the like.

In the present specification, the arylene group means a group where two bonding positions exist at an aryl group, that is, a divalent group. Excepting that the groups are each a divalent group, the aforementioned description of the aryl group may be applied.

The multivalent organic group derived from an arbitrary compound refers to a residue in which a plurality of hydrogen atoms bonded to the arbitrary compound are removed. In one example, a tetravalent organic group derived from cyclobutane refers to a residue in which any four hydrogen atoms bonded to cyclobutane are removed.

In the present specification, the notation

or ―* in the chemical formula refers to a residue in which hydrogens at the relevant site are removed. For example, the notation

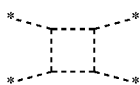

refers to a residue in which four hydrogen atoms bonded to carbon numbers 1, 2, 3, and 4 of cyclobutane are removed, that is, it refers to any one of tetravalent organic groups derived from cyclobutane.

In the present specification, a direct bond or a single bond refers to being linked to a bond line without existence of an atom or an atomic group at the relevant position. Specifically, it refers to a case where no additional atom exists in a portion represented by $L_1$ and $L_2$ in the chemical formula.

Polymer

The polymer includes a repeating unit represented by Chemical Formula 1 or a repeating unit represented by Chemical Formula 2. That is, the polymer may include one kind of the repeating unit represented by Chemical Formula 1 or one kind of the repeating unit represented by Chemical Formula 2, or both the repeating unit represented by Chemical Formula 1 and the repeating unit represented by Chemical Formula 2.

In the repeating units of Chemical Formulas 1 and 2, $X_1$ and $X_2$ are each independently a tetravalent organic group derived from a hydrocarbon having 4 to 20 carbon atoms, or a tetravalent organic group in which at least one H of the tetravalent organic groups is substituted with a halogen or one or more —$CH_2$— are replaced with —O—, —CO—, —S—, —SO—, —$SO_2$—, or —CONH— such that oxygen or sulfur atoms are not directly linked.

As a specific example, $X_1$ and $X_2$ may each independently be a tetravalent organic group represented by the following Chemical Formula 3.

[Chemical Formula 3]

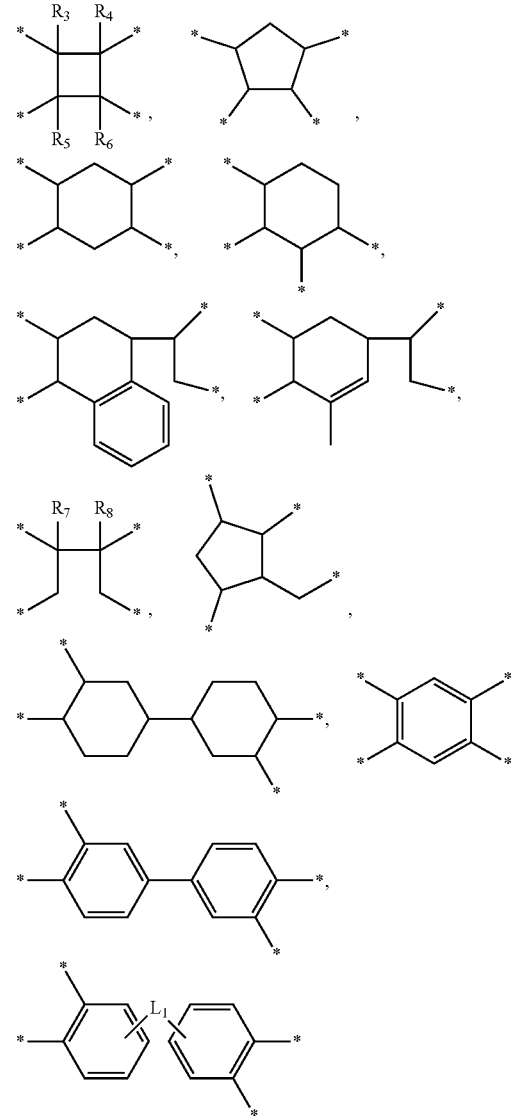

In Chemical Formula 3, $R_3$ to $R_8$ are each independently hydrogen or an alkyl group having 1 to 6 carbon atoms, and $L_1$ is any one selected from the group consisting of a single bond, —O—, —CO—, —COO—, —S—, —SO—, —$(CH_2)_z$—, —$O(CH_2)_zO$—, —$COO(CH_2)_zOCO$—, —CONH—, phenylene, or a combination thereof, wherein the $R_9$ and $R_{10}$ are each independently hydrogen, an alkyl group, or a fluoroalkyl group having 1 to 10 carbon atoms, and z is an integer of 1 to 10.

More preferably, $X_1$ and $X_2$ are each independently an organic group of the following Chemical Formula 3-1 derived from cyclobutane-1,2,3,4-tetracarboxylic dianhydride, an organic group of the following Chemical Formula 3-2 derived from 1,3-dimethylcyclobutane-1,2,3,4-tetracarboxylic dianhydride, or an organic group of the following Chemical Formula 3-3 derived from tetrahydro-[3,3'-bifuran]-2,2',5,5'-tetraene.

[Chemical Formula 3-1]

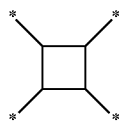

[Chemical Formula 3-2]

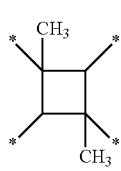

[Chemical Formula 3-3]

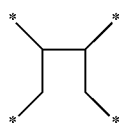

Meanwhile, the $Y_1$ and $Y_2$ are each defined as a divalent organic group represented by the following Chemical Formula 4, which can provide a polymer for a liquid crystal aligning agent having various structures capable of exhibiting the above-described effects.

[Chemical Formula 4]

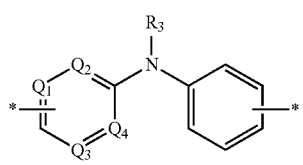

In Chemical Formula 4, at least one of $Q_1$ to $Q_4$ is a nitrogen atom and each of the rest is a carbon atom, and $R_3$ is hydrogen or an alkyl group having 1 to 6 carbon atoms.

The functional group represented by Chemical Formula 4 has a structural characteristic in which two aromatic cyclic compounds, preferably one heteroaromatic cyclic compound and one aromatic cyclic compound, are bonded via a secondary amine group or a tertiary amine group. Thereby, even while satisfying the same or higher level of alignment and after-image characteristics as a liquid crystal aligning agent, the voltage holding ratio can be greatly improved so excellent electrical characteristics can be realized.

On the other hand, when two aromatic cyclic compounds are bonded by a single bond without a secondary amine group or a tertiary amine group, there may be technical problems that the alignment property of the liquid crystal aligning agent is poor and the voltage holding ratio decreases.

In addition, when both of the two aromatic cyclic compounds bonded through a secondary amine group or a tertiary amine group do not contain a heteroatom such as a nitrogen atom, a sufficient imidization reaction cannot proceed (for example, through heat treatment at 230° C.) even if the imidization reaction proceeds on the polyamic acid or the polyamic acid ester formed by the reaction between the amine and the acid anhydride. Thus, there is a limitation in that the imidization rate decreases in the final liquid crystal alignment film. This appears to be due to the difference in physical and chemical properties of the amine, polyamic acid, and polyamic acid ester caused by the difference in the structure of the amine compound.

Specifically, in Chemical Formula 4, one of $Q_1$ to $Q_4$ may be nitrogen and the rest may be carbon. More specifically, in $Q_1$ to $Q_4$ of Chemical Formula 4, one of $Q_2$ and $Q_4$ may be nitrogen and the other may be carbon. Preferably, in $Q_1$ to $Q_4$ of Chemical Formula 4, $Q_2$ may be nitrogen, and $Q_1$, $Q_3$, and $Q_4$ may be carbon.

That is, Chemical Formula 4 may have a structure in which a pyridine compound where one of the six carbons of benzene is substituted by nitrogen and a benzene compound are asymmetrically bonded through a secondary amine or a tertiary amine. Accordingly, the liquid crystal display device to which the liquid crystal aligning agent composition of one embodiment is applied can realize high voltage holding ratio and liquid crystal alignment property.

On the other hand, in Chemical Formula 4, when one of $Q_1$ and $Q_3$ is nitrogen, there may be a problem that the electrical characteristic and long-term reliability of the prepared alignment film gradually decreases.

Further, in Chemical Formula 4, $R_3$ may be hydrogen.

Chemical Formula 4 is a repeating unit derived from a diamine, which is a precursor used for forming a polymer for a liquid crystal aligning agent, and is considered to result from the use of an asymmetric pyridine-based diamine as described below.

In view of the fact that the structure of an asymmetric pyridine diamine or the repeating unit derived therefrom and the effects resulting therefrom have never been recognized in the field of the polymer for the liquid crystal aligning agent previously known in the art, the repeating unit of Chemical Formula 4 and the diamine compound which is a precursor thereof are considered to be novel.

In addition, Chemical Formula 4 may include functional groups represented by the following Chemical Formulas 4-1 to 4-3.

[Chemical Formula 4-1]

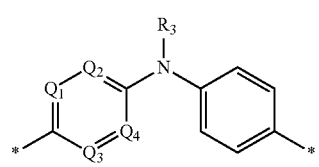

[Chemical Formula 4-2]

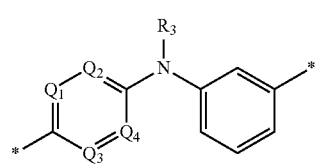

[Chemical Formula 4-3]

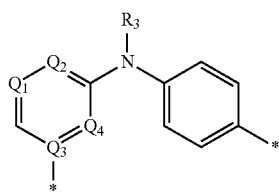

In Chemical Formulas 4-1 to 4-3, the definitions of $Q_1$ to $Q_4$ and $R_3$ include those described above in Chemical Formula 4.

As such, as Chemical Formula 4 includes the functional groups represented by Chemical Formulas 4-1 to 4-3, the liquid crystal display device to which the polymer for the liquid crystal aligning agent of one embodiment is applied can realize a high voltage holding ratio and liquid crystal alignment property.

More specifically, Chemical Formula 4 may include a functional group represented by the following Chemical Formulas 4-4 to 4-6.

[Chemical Formula 4-4]

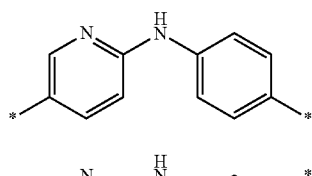

[Chemical Formula 4-5]

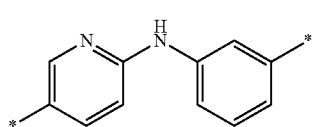

[Chemical Formula 4-6]

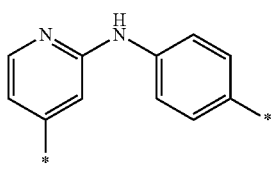

Examples of the method for preparing the polymer for a liquid crystal aligning agent are not particularly limited, and for example, a method including the steps of: reacting a heteroaromatic compound of the following Chemical Formula 11 with an aromatic compound of Chemical Formula 12 to prepare a compound of the following Chemical Formula 13; reducing the compound of Chemical Formula 13 to prepare a diamine of the following Chemical Formula 14; and reacting the diamine of Chemical Formula 14 with a tetracarboxylic acid or an anhydride thereof to prepare a polymer for a liquid crystal aligning agent, can be used.

[Chemical Formula 11]

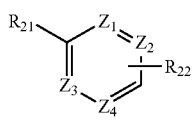

In Chemical Formula 11, $R_{21}$ is a halogen atom, $R_{22}$ is a nitrogen oxide functional group, and
at least one of $Z_1$ to $Z_4$ is nitrogen and the rest are carbon,

[Chemical Formula 12]

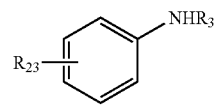

wherein, in Chemical Formula 12, $R_3$ is hydrogen or an alkyl group having 1 to 10 carbon atoms, and $R_{23}$ is an amino group or a nitrogen oxide functional group,

[Chemical Formula 13]

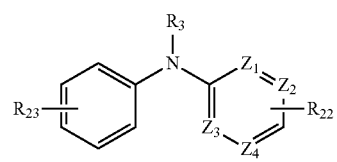

[Chemical Formula 14]

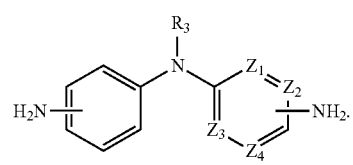

Preferably, in Chemical Formula 11, $R_{21}$ is a chlorine atom, $R_{22}$ is a nitro group, either $Z_1$ or $Z_3$ is nitrogen and the rest is carbon, $Z_2$ and $Z_4$ may be carbon. That is, preferred examples of Chemical Formula 11 include 2-chloro-5-nitropyridine, 2-chloro-4-nitropyridine, or the like.

Meanwhile, in Chemical Formula 12, $R_3$ is hydrogen, and $R_{23}$ may be a nitro group or an amino group. That is, preferred examples of Chemical Formula 12 include paraphenylene diamine, metaphenylene diamine, and the like.

Specifically, in the step of preparing the compound of Chemical Formula 13, the compound of Chemical Formula 13 can be prepared by reacting the heteroaromatic compound of Chemical Formula 11 with the heteroaromatic compound of Chemical Formula 12. Specifically, a reaction in which the halogen element of $R_{21}$ included in the heteroaromatic compound of Chemical Formula 11 is substituted with a nitrogen element contained in the heteroaromatic compound of Chemical Formula 12 can be carried out.

The reaction may be carried out under conditions of being proceeded in the presence of a tertiary amine catalyst at 50° C. to 150° C. for 10 to 20 hours. The reaction can be carried out in the presence of various organic solvents previously known in the art, and specific examples of the organic solvent include ethyl acetate, tetrahydrofuran, N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methylnonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, or the like. These solvents may be used alone or in combination.

In the nitrogen oxide functional group, the nitrogen oxide is a compound in which a nitrogen atom and an oxygen atom are bonded, and the nitrogen oxide functional group means a functional group containing a nitrogen oxide in the functional group. As an example of the nitrogen oxide functional group, a nitro group (—$NO_2$) or the like can be used.

The compound of Chemical Formula 13 thus prepared can be subjected to reduction reaction to prepare a diamine compound of Chemical Formula 14. Specifically, as the nitrogen oxide functional group of $R_{22}$ or $R_{23}$ contained in the compound of Chemical Formula 13 is reduced under reducing conditions to a primary amino group, a diamine compound can be synthesized.

The reduction reaction may be carried out under mild conditions of being proceeded in the presence of a palladium/carbon catalyst at room temperature for 10 to 15 hours. The reaction may be carried out in the presence of various organic solvents previously known in the art, and specific examples of the organic solvent include ethyl acetate, tetrahydrofuran, N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methylnonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, or the like. These solvents may be used alone or in combination.

The details of $Z_1$ to $Z_4$, $R_3$, $R_{22}$, and $R_{23}$ described in Chemical Formulas 13 and 14 include those described above in Chemical Formulas 11 and 12.

Specific examples of the compound of Chemical Formula 14 include compounds represented by the following Chemical Formulas 14-1 to 14-3.

[Chemical Formula 14-1]

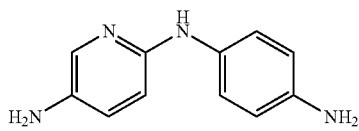

[Chemical Formula 14-2]

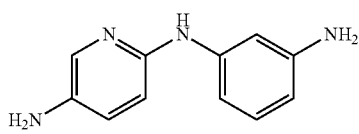

[Chemical Formula 14-3]

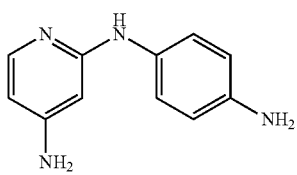

The diamine of Chemical Formula 14 prepared through the above steps can be reacted with a tetracarboxylic acid or its anhydride commonly used in the preparation of polyamic acids, for example, pyromellitic dianhydride, 3,3',4,4'-biphenyltetracarboxylic dianhydride, or cyclobutane-1,2,3,4-tetracarboxylic dianhydride, or 1,3-dimethylcyclobutane-1,2,3,4-tetracarboxylic dianhydride, tetrahydro-[3,3'-bifuran]-2,2',5,5'-tetraene, or the like to prepare a polymer including amic acid, an amic acid ester, or a mixture thereof.

Alternatively, if necessary, in addition to the diamine of Chemical Formula 14 prepared through the above steps, various kinds of diamine compounds commonly known in the field relevant to liquid crystal aligning agents, for example, p-phenylenediamine, 4,4-oxydianiline, 4,4'-methylenedianiline, and the like, can be mixed to prepare amic acid, an amic acid ester, or a mixture thereof.

The reaction conditions can be appropriately adjusted with reference to the preparation conditions of polyamic acid known in the art.

The repeating unit represented by Chemical Formula 1 or the repeating unit represented by Chemical Formula 2 may be contained in an appropriate amount depending on the desired properties.

Specifically, the repeating unit represented by Chemical Formula 1 may be contained in an amount of 0 mol % to 95 mol %, or 10 mol % to 90 mol %, based on the total repeating units in the polymer. Within this range, a polymer for a liquid crystal aligning agent having excellent coating properties can be provided.

The repeating unit represented by Chemical Formula 2 may be contained in an amount of 0 mol % to 80 mol %, 0 mol % to 40 mol %, or 0.1 mol % to 30 mol % based on the total repeating units in the polymer. In the repeating unit represented by Chemical Formula 2, the imide conversion rate varies depending on the structure and content of the main chain during the high-temperature heat treatment process after light irradiation, thereby affecting the crystallinity of the main chain of the molecule. If the amount exceeds the above range, the alignment stability may be lowered by the degree of sticking of the molecular chains.

Meanwhile, the polymer may further include a repeating unit represented by the following Chemical Formula 7 or 8. That is, the polymer may include one specie of the repeating unit represented by Chemical Formula 7, or one specie of the repeating unit represented by Chemical Formula 8, or two species of the repeating unit represented by Chemical Formula 7, and the repeating unit represented by Chemical Formula 8.

[Chemical Formula 7]

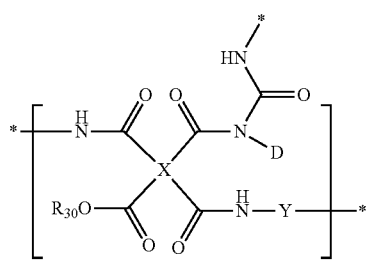

-continued

[Chemical Formula 8]

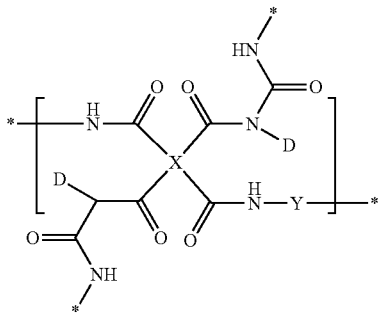

In Chemical Formula 7 or 8, X is $X_1$ of Chemical Formula 1 or $X_2$ of Chemical Formula 2, Y is $Y_1$ of Chemical Formula 1 or $Y_2$ of Chemical Formula 2, $R_{30}$ is hydrogen or an alkyl group having 1 to 10 carbon atoms, and D is D of Chemical Formula 5.

Chemical Formula 7 or 8 is a repeating unit in which the polyamic acid repeating unit represented by Chemical Formula 1 or the polyamic acid ester repeating unit represented by Chemical Formula 2 forms a crosslinked structure with the polycarbodiimide compound represented by Chemical Formula 5, and the crosslinking structure is introduced between the polymer for a liquid crystal aligning agent and the internal main chain of the finally prepared liquid crystal alignment film via the repeating units of Chemical Formula 7 or 8, thereby realizing excellent mechanical strength.

More specifically, the repeating unit represented by Chemical Formula 7 or 8 can be formed while a carboxyl group of the polyamic acid repeating unit represented by Chemical Formula 1 or an ester group of the polyamic acid ester repeating unit represented by Chemical Formula 2 reacts with a carbodiimide functional group of the polycarbodiimide compound represented by Chemical Formula 5.

The repeating unit represented by Chemical Formula 7 or 8 may be contained in the liquid crystal aligning composition in an amount of 0.1 mol % to 20 mol % based on the mole number of the repeating unit represented by Chemical Formula 1 or 2. When the molar ratio of the repeating unit represented by Chemical Formula 7 or 8 is too large, the degree of crosslinking of the polymer for a liquid crystal aligning agent is excessively increased, and thereby the flexibility of the polymer can be reduced and the liquid crystal alignment property due to the polyimide can also be reduced.

On the other hand, if the molar ratio of the repeating unit represented by Chemical Formula 7 or 8 becomes too small, it may be difficult to sufficiently realize the effect of improving the mechanical strength due to the increase in the degree of crosslinking of the polymer for a liquid crystal aligning agent.

Polycarbodiimide Compound

In addition to the above-described polymer for a liquid crystal aligning agent, the liquid crystal aligning agent composition of one embodiment of the present invention includes a polycarbodiimide compound, and thereby the mechanical strength of the liquid crystal alignment film prepared therefrom can be improved.

The polycarbodiimide compound means a compound containing at least two carbodiimide-based functional groups in its molecule. The carbodiimide functional group is a functional group represented by —N=C=N— containing a double bond between carbon and nitrogen, and can exhibit high reactivity with the carboxyl group of the polyamic acid repeating unit represented by Chemical Formula 1 or the ester group of the polyamic acid ester repeating unit represented by Chemical Formula 2.

Specifically, the polycarbodiimide compound may be a compound represented by the following Chemical Formula 5.

[Chemical Formula 5]

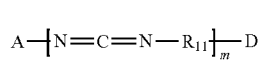

In Chemical Formula 5,

A is an organic group including —O—, —CO—, —S—, —C(CH$_3$)$_2$—, —C(CF$_3$)$_2$—, —CONH—, —COO—, —(CH$_2$)$_b$—, —O(CH$_2$)$_b$O—, —COO—(CH$_2$)$_b$—OCO—, a urethane-based functional group, or a urea-based functional group, b is an integer of 1 to 10, $R_{11}$ is an alkylene group having 1 to 20 carbon atoms or an arylene group having 6 to 20 carbon atoms, m is an integer of 1 to 5, and D is a functional group represented by the following Chemical Formula 6,

[Chemical Formula 6]

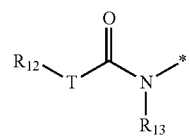

wherein, in Chemical Formula 6, T is —O— or NH—, $R_{12}$ is hydrogen, a halogen, an alkyl group having 1 to 6 carbon atoms, an aryl group having 6 to 20 carbon atoms, or an ether group, and $R_{13}$ is hydrogen or an alkyl group having 1 to 6 carbon atoms.

The urethane-based functional group includes a functional group derived from a urethane group (—OCONH—), or a urethane group, and the functional group derived from the urethane group may mean that another functional group is substituted for a hydrogen atom of the urethane group. Examples of the substituted functional groups are not particularly limited, and for example, deuterium; a halogen group; a cyano group; a nitro group; a hydroxyl group; a carbonyl group; an ester group; an imide group; an amide group; an amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an arylphosphine group; or a heterocyclic group containing at least one of N, O, and S atoms can be used.

The urethane-based functional group includes a functional group derived from a urethane group (—OCONH—), or a urethane group, and the functional group derived from the urethane group may mean that another functional group is substituted for a hydrogen atom of the urethane group.

Specifically, in the functional group represented by Chemical Formula 6, T is —O—, $R_{12}$ is an ether group of the following Chemical Formula 6-1, and $R_{13}$ may be hydrogen.

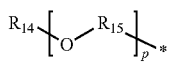
[Chemical Formula 6-1]

In Chemical Formula 6-1, $R_{14}$ is hydrogen or an alkyl group having 1 to 6 carbon atoms, $R_{15}$ is an alkylene group having 1 to 6 carbon atoms, and p is an integer of 1 or more, or 1 to 5.

Further, in the functional group represented by Chemical Formula 6, T is —NH—, $R_{12}$ is hydrogen, a halogen, an alkyl group having 1 to 6 carbon atoms, or an aryl group having 6 to 20 carbon atoms, and $R_{13}$ may be hydrogen.

Meanwhile, in Chemical Formula 5, the functional group represented by A may be a functional group represented by the following Chemical Formula 21 or a functional group represented by the following Chemical Formula 22.

[Chemical Formula 21]

In Chemical Formula 21, R' is a divalent organic functional group, and $G_1$ is a functional group represented by Chemical Formula 6. Preferably, in Chemical Formula 21, $G_1$ is a functional group of Chemical Formula 6 in which T is —O—, $R_{12}$ is an ether group of the following Chemical Formula 6-1, and $R_{13}$ is hydrogen.

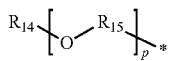
[Chemical Formula 6-1]

In Chemical Formula 6-1, $R_{14}$ is hydrogen or an alkyl group having 1 to 6 carbon atoms, $R_{15}$ is an alkylene group having 1 to 6 carbon atoms, and p is an integer of 1 to 5.

In Chemical Formula 21, examples of the divalent organic functional group used as R' are not particularly limited, and various functional groups commonly used as bifunctional crosslinking chains in the field of crosslinking agents, for example, a straight chain alkylene group having 1 to 50 carbon atoms, an arylene group having 6 to 20 carbon atoms, —O—, —CO—, —S—, —C(CH$_3$)$_2$—, —C(CF$_3$)$_2$—, —CONH—, —COO—, —(CH$_2$)$_b$—, —O(CH$_2$)$_b$O—, —COO—(CH$_2$)$_b$—OCO—, a urethane-based functional group, and a urea-based functional group, can be used.

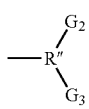
[Chemical Formula 22]

In Chemical Formula 22, R″ is a trivalent organic functional group, and $G_2$ and $G_3$ are each independently a functional group represented by Chemical Formula 6. Preferably, in Chemical Formula 22, $G_2$ is a functional group in which T is —O—, $R_{12}$ is an ether group of the following Chemical Formula 6-1, and $R_{13}$ is hydrogen.

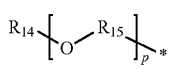
[Chemical Formula 6-1]

In Chemical Formula 6-1, $R_{14}$ is hydrogen or an alkyl group having 1 to 6 carbon atoms, $R_{15}$ is an alkylene group having 1 to 6 carbon atoms, and p is an integer of 1 to 5.

In Chemical Formula 22, examples of the trivalent organic functional group used as R″ are not particularly limited, and various functional groups commonly used as trivalent crosslinking chains in the field of crosslinking agents, for example, a branched alkylene group having 1 to 50 carbon atoms or the like, can be used.

Further, in Chemical Formula 22, $G_3$ is a functional group of Chemical Formula 6 where T is —NH—, $R_{12}$ is hydrogen, a halogen, an alkyl group having 1 to 6 carbon atoms, or an aryl group having 6 to 20 carbon atoms, and $R_{13}$ is hydrogen.

As a specific example in which the functional group represented by A in Chemical Formula 5 is a functional group represented by Chemical Formula 21, XR-5517 (available from Stahl) can be mentioned. As a specific example in which the functional group represented by A in Chemical Formula 5 is a functional group represented by Chemical Formula 22, XR-5580 (available from Stahl) or XR-13-554 (available from Stahl) can be mentioned.

The polycarbodiimide compound may have a solid content of 40% to 100%, 40% to 60%, or 80% to 100%. In the case of a solution prepared in a state of being dissolved in an organic solvent using a polycarbodiimide compound as a solute, the solid content may mean the content of the solute in the total weight of the solution.

In particular, as the polycarbodiimide compound includes at least two carbodiimide functional groups which are crosslinkable functional groups, the surface area capable of reacting with the polyamic acid repeating unit or the polyamic acid ester repeating unit or the like increases in the liquid crystal aligning agent composition and thus the crosslinked structure can be formed more easily.

The polycarbodiimide compound is preferably contained in an amount of 0.5 wt % to 15 wt %, 1 wt % to 10 wt %, or 2 wt % to 5 wt % based on the total weight of the liquid crystal aligning agent composition.

If the content of the polycarbodiimide compound is too large, the flexibility of the polymer may decrease as the degree of crosslinking of the polymer for a liquid crystal aligning agent is excessively increased. Further, coating properties onto a substrate may be reduced due to an increase in the viscosity of the composition or to a gelation reaction in the composition.

Meanwhile, if the content of the polycarbodiimide compound becomes too small, it may be difficult to sufficiently realize the effect of improving the mechanical strength due to the increase in the degree of crosslinking of the polymer for a liquid crystal aligning agent.

Method for Preparing Liquid Crystal Alignment Film

The present invention also provides a method for preparing a liquid crystal alignment film including the steps of: coating the liquid crystal aligning agent composition onto a substrate to form a coating film (step 1); drying the coating film (step 2); irradiating the coating film immediately after the drying step with light or rubbing the coating film to perform alignment treatment (step 3); and heat-treating and curing the alignment-treated coating film (step 4).

Step 1 is a step of coating the above-mentioned liquid crystal aligning agent composition onto a substrate to form a coating film.

The method of coating the liquid crystal aligning agent composition onto a substrate is not particularly limited, and for example, a method such as screen printing, offset printing, flexographic printing, inkjet printing, and the like can be used.

Further, the liquid crystal aligning agent composition may be that dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. These solvents can be used alone or in combination.

The liquid crystal aligning agent composition may further include other components in addition to the organic solvent. In a non-limiting example, when the liquid crystal aligning agent composition is coated, additives capable of improving the uniformity of the thickness of a film and the surface smoothness, improving the adhesion between a liquid crystal alignment film and a substrate, changing the dielectric constant and conductivity of a liquid crystal alignment film, or increasing the denseness of a liquid crystal alignment film, may be further included. Examples of these additives include various kinds of solvents, surfactants, silane-based compounds, dielectrics, crosslinking compounds, etc.

Step 2 is a step of drying the coating film formed by coating the liquid crystal aligning agent composition onto a substrate.

The step of drying the coating film may be performed by using a method such as heating of a coating film or vacuum evaporation, and is preferably performed at 50° C. to 150° C., or 60° C. to 140° C.

Step 3 is a step of irradiating the coating film immediately after the drying step with light or rubbing the coating film to perform alignment treatment.

In the present specification, the "irradiating the coating film immediately after the drying step" refers to irradiating the film with a light immediately after the drying without carrying out a heat treatment at a temperature higher than that of the drying step, and steps other than the heat treatment can be added.

More specifically, when a liquid crystal alignment film is prepared by using a conventional liquid crystal alignment agent including polyamic acid or polyamic acid ester, it includes a step of irradiating light after essentially performing a high-temperature heat treatment for imidization of polyamic acid. However, when a liquid crystal alignment film is prepared using the liquid crystal alignment agent of the one embodiment described above, it does not include the heat treatment step, and light is directly irradiated to perform alignment treatment, and then the alignment-treated coating film is cured by a heat treatment, thereby being capable of preparing a liquid crystal alignment film.

Further, in the alignment treatment step, the light irradiation may be performed by irradiating polarized ultraviolet rays having a wavelength of 150 nm to 450 nm. In this case, the intensity of the light exposure may vary depending on the kind of the polymer for a liquid crystal aligning agent, and preferably energy of 10 mJ/cm$^2$ to 10 J/cm$^2$, or 30 mJ/cm$^2$ to 2 J/cm$^2$, may be irradiated.

As for the ultraviolet rays, polarized ultraviolet rays selected among the ultraviolet rays subjected to polarization treatment by a method of passing through or reflecting by a polarizing device using a substrate in which a dielectric anisotropic material is coated onto the surface of a transparent substrate such as quartz glass, soda lime glass, soda lime-free glass, etc., a polarizer plate on which aluminum or metal wires are finely deposited, or a Brewster's polarizing device by the reflection of quartz glass, etc., are irradiated to perform the alignment treatment. Herein, the polarized ultraviolet rays may be irradiated perpendicularly to the surface of the substrate, or may be irradiated by directing an angle of incidence toward a specific angle. By this method, the alignment ability of the liquid crystal molecules is imparted to the coating film.

Further, in the alignment treatment step, a rubbing treatment can employ a method using a rubbing cloth. More specifically, in the rubbing treatment, the surface of the coating film after the heat treatment step can be rubbed in one direction while rotating a rubbing roller of which a rubbing cloth is attached to a metal roller.

Step 4 is a step of heat-treating and curing the alignment-treated coating film.

The step of heat-treating and curing the alignment-treated coating film is a step that is performed after light irradiation even in the conventional method of preparing a liquid crystal alignment film using a polymer for a liquid crystal aligning agent containing a polyamic acid or a polyamic acid ester, and is distinguished from a heat treatment step that is performed by coating the liquid crystal aligning agent composition onto a substrate and then performing imidization of the liquid crystal aligning agent before irradiating the light or while irradiating the light.

In this case, the heat treatment may be performed by a heating means such as a hot plate, a hot-air circulation furnace, an infrared furnace, and the like, and the heat treatment is preferably performed at a temperature of 150° C. to 300° C., or 180° C. to 250° C.

Meanwhile, the method may further include heat-treating the coating film immediately after the drying step at a temperature equal to or higher than that of the drying step, if necessary, after a step of drying the coating film (step 2). The heat treatment may be performed by a heating means such as a hot plate, a hot-air circulation furnace, and an infrared furnace, and is preferably carried out at a temperature of 150° C. to 250° C. In this process, the liquid crystal aligning agent can be imidized.

That is, the method for preparing a liquid crystal alignment film may include the steps of: coating the above-mentioned liquid crystal aligning agent composition onto a substrate to form a coating film (step 1); drying the coating film (step 2); heat-treating the coating film immediately after the drying step at a temperature equal to or higher than that of the drying step (step 3), irradiating the heat-treated coating film with light or rubbing the coating film to perform alignment treatment (step 4); and heat-treating and curing the alignment-treated coating film (step 5).

Liquid Crystal Alignment Film

Further, the present invention may provide a liquid crystal alignment film prepared in accordance with the method for preparing a liquid crystal alignment film described above. Specifically, the liquid crystal alignment film may include an aligned cured product of the liquid crystal aligning agent composition of the one embodiment. The aligned cured product means a material obtained through an alignment step and a curing step of the liquid crystal aligning agent composition of the one embodiment.

The thickness of the liquid crystal alignment film is not particularly limited, but for example, it can be freely adjusted within the range of 0.01 μm to 1000 μm. If the thickness of the liquid crystal alignment film increases or decreases by a specific value, the physical properties measured in the alignment film may also change by a certain value.

As described above, when a liquid crystal aligning agent composition including a polymer including a repeating unit represented by Chemical Formula 1 or a repeating unit represented by Chemical Formula 2, and a polycarbodiimide compound represented by Chemical Formula 5, is used, a liquid crystal alignment film having enhanced durability due to an increase in the film strength can be prepared.

Liquid Crystal Display Device

In addition, the present invention provides a liquid crystal display device including the liquid crystal alignment film described above.

The liquid crystal alignment film may be introduced into a liquid crystal cell by a known method, and likewise, the liquid crystal cell may be introduced into a liquid crystal display device by a known method. The liquid crystal alignment film can be prepared from the liquid crystal aligning agent composition of another embodiment, thereby achieving excellent stability together with excellent physical properties. Specifically, the liquid crystal display device which can have a high voltage holding ratio at a high temperature and a low frequency, has excellent electrical characteristics, reduces performance degradation of a contrast ratio or an image sticking (after-image) phenomenon, and has excellent film strength, can be provided.

Advantageous Effects

According to the present invention, a liquid crystal aligning agent composition for forming a liquid crystal alignment film exhibiting excellent alignment and electrical characteristics and simultaneously having excellent film strength, a method for preparing a liquid crystal alignment film using the same, and a liquid crystal alignment film and a liquid crystal display device using the same can be provided.

DETAILED DESCRIPTION OF THE EMBODIMENTS

The prevention invention will be described in more detail by way of examples. However, these examples are given for illustrative purposes only, and the scope of the invention is not intended to be limited by these examples.

PREPARATION EXAMPLES: PREPARATION OF DIAMINE

Preparation Example 1

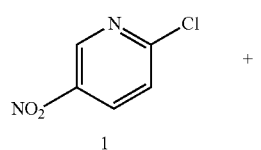

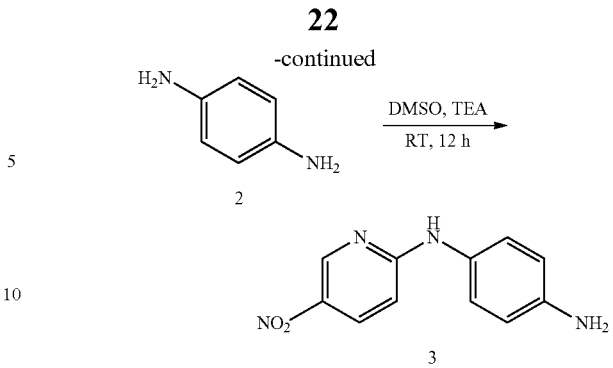

18.3 g (100 mmol) of 2-chloro-5-nitropyridine (compound 1) and 12.5 g (98.6 mmol) of para-phenylenediamine (p-PDA, compound 2) were completely dissolved in 200 mL of dimethylsulfoxide (DMSO). 23.4 g (200 mmol) of triethylamine (TEA) was then added thereto and stirred at room temperature for 12 hours. When the reaction was completed, the reaction product was poured into a container containing 500 mL of water and stirred for 1 hour. The solid obtained by filtration was washed with 200 mL of water and 200 mL of ethanol to synthesize 16 g (61.3 mmol) of Compound 3 (yield: 60%).

Compound 3 was dissolved in 200 mL of a mixed solution of ethyl acetate (EA) and THF in a ratio of 1:1. 0.8 g of palladium (Pd)/carbon (C) was added thereto and stirred under a hydrogen atmosphere for 12 hours. After completion of the reaction, the reaction mixture was filtered through a celite pad and the filtrate was concentrated to prepare 11 g of a diamine of Compound 4 (yield: 89%).

Preparation Example 2

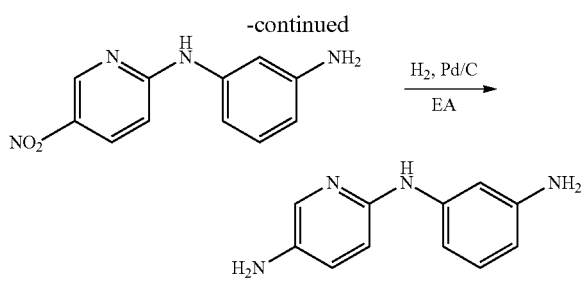

The diamine of Preparation Example 2 was prepared in the same manner as in Preparation Example 1, except that metaphenylene diamine (m-PDA) was used instead of paraphenylene diamine (p-PDA, compound 2).

Preparation Example 3

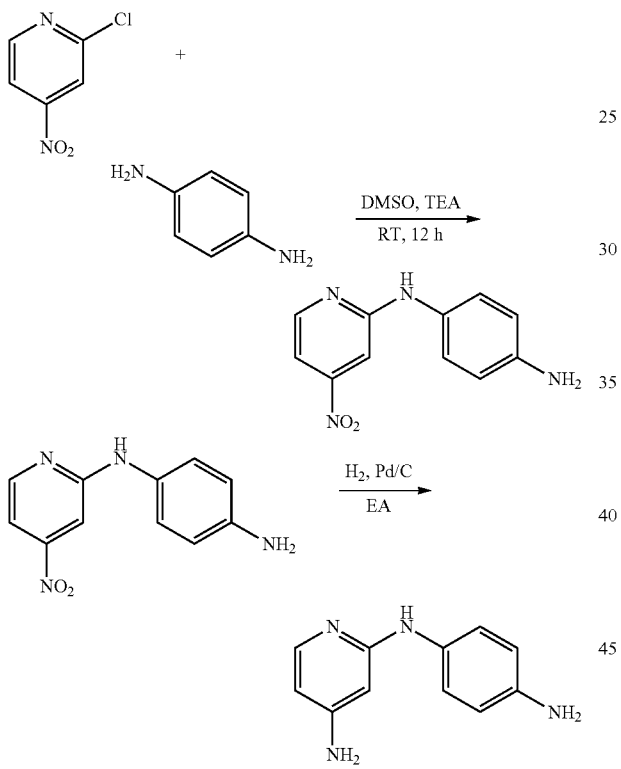

The diamine of Preparation Example 3 was prepared in the same manner as in Preparation Example 1, except that 2-chloro-4-nitropyridine was used instead of 2-chloro-5-nitropyridine (compound 1).

Examples: Preparation of Liquid Crystal Aligning Agent Composition

Example 1

1.408 g (7 mmol) of the diamine prepared in Preparation Example 1 was completely dissolved in 15.37 g of anhydrous N-methyl pyrrolidone (NMP).

Then, 1.304 g (6.65 mmol) of cyclobutane-1,2,3,4-tetracarboxylic dianhydride (CBDA) was added to the solution under an ice bath, and stirred at room temperature for 16 hours to prepare a polyamic acid solution.

To the polyamic acid solution, XR-5517 represented by the following Chemical Formula A (available from Stahl; bifunctional type having a solid content of 50%) was added in an amount of 2 wt % based on the total solution, and the mixture was stirred at 25° C. for 16 hours to prepare a liquid crystal aligning composition.

[Chemical Formula A]

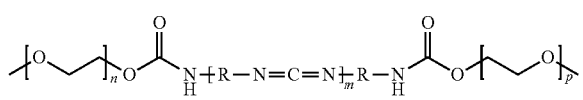

in Chemical Formula A, R=divalent organic functional group, m=1~5; n=1~5; and p=1~5.

Example 2

A liquid crystal aligning agent composition was prepared in the same manner as in Example 1, except that XR-5580 represented by the following Chemical Formula B (available from Stahl; trifunctional type having a solid content of 50%] was used instead of XR-5517.

[Chemical Formula B]

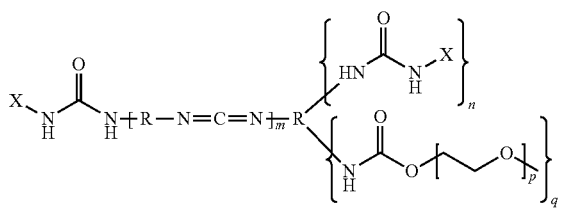

in Chemical Formula B, R=trivalent organic functional group, X=hydrogen, a halogen, an alkyl group having 1 to 6 carbon atoms, or an aryl group having 6 to 20 carbon atoms, m=1~5; p=1~5, n=1 and q=1

Example 3

A liquid crystal aligning agent composition was prepared in the same manner as in Example 1, except that XR-13-554 represented by the following Chemical Formula C (available from Stahl; trifunctional type having a solid content of 100%] was used instead of XR-5517.

[Chemical Formula C]

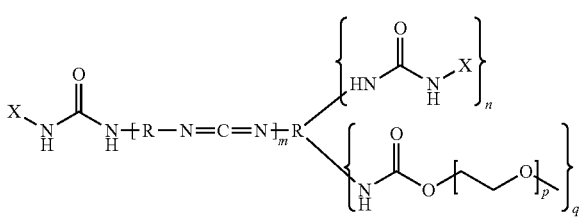

In Chemical Formula C, R=trivalent organic functional group, X=hydrogen, a halogen, an alkyl group having 1 to 6 carbon atoms, or an aryl group having 6 to 20 carbon atoms, m=1~5; p=1~5, n=1 and q=1.

Example 4

A liquid crystal aligning agent composition was prepared in the same manner as in Example 1, except that XR-5517 was added to the polyamic acid solution in an amount of 5 wt % based on the total solution.

Example 5

A liquid crystal aligning agent composition was prepared in the same manner as in Example 1, except that the diamine prepared in Preparation Example 2 was used instead of the diamine prepared in Preparation Example 1.

Example 6

A liquid crystal aligning agent composition was prepared in the same manner as in Example 1, except that the diamine prepared in Preparation Example 3 was used instead of the diamine prepared in Preparation Example 1.

Comparative Example: Preparation of Liquid Crystal Aligning Agent Composition

Comparative Example 1

A liquid crystal aligning agent composition was prepared in the same manner as in Example 1, except that XR-5517 was not used.

Comparative Example 2

A liquid crystal aligning agent composition was prepared in the same manner as in Example 1, except that 6-(4-aminophenyl)pyridin-3-amine represented by the following Chemical Formula D was used instead of the diamine prepared in Preparation Example 1.

[Chemical Formula D]

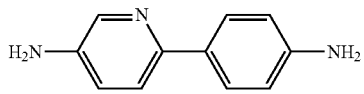

Comparative Example 3

A liquid crystal aligning agent composition was prepared in the same manner as in Example 1, except that 4,4'-diaminodiphenylamine represented by the following Chemical Formula E was used instead of the diamine prepared in Preparation Example 1.

[Chemical Formula E]

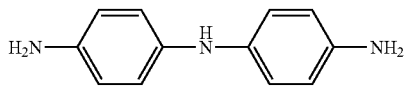

Experimental Example: Measurement of Physical Properties of the Liquid Crystal Aligning Agent Compositions Obtained in the Examples and Comparative Examples A liquid crystal cell was prepared by using the liquid crystal aligning agent compositions obtained in the examples and comparative examples. The physical properties of each liquid crystal alignment cell were measured by the following method, and the results are shown in Table 1 below.

Specifically, the liquid crystal aligning agent compositions prepared in the examples and comparative examples were coated onto each of the upper/lower substrates for the voltage holding ratio (VHR) in which an ITO electrode having a thickness of 60 nm and an area of 1 cm×1 cm was patterned on a rectangular glass substrate having a size of 2.5 cm×2.7 cm using a spin coating method. Then, the substrates onto which the liquid crystal aligning agent composition was coated were placed on a hot plate at about 80° C. and dried for 2 minutes to evaporate the solvent. In order to subject the thus-obtained coating film to alignment treatment, ultraviolet rays of 254 nm were irradiated with an intensity of 0.25 J/cm$^2$ using an exposure apparatus in which a linear polarizer was adhered to the coating film of each of the upper/lower plates. Subsequently, the alignment-treated upper/lower plates were calcinated (cured) in an oven at about 230° C. for 15 minutes to obtain a coating film having a thickness of 0.1 μm. Then, a sealing agent impregnated with ball spacers having a size of 4.5 μm was applied to the edge of the upper plate excluding the liquid crystal injection hole. Then, the alignment films formed on the upper plate and the lower plate were aligned such that they faced each other and the alignment directions were aligned with each other, and then the upper and lower plates were bonded together and the sealing agent was cured to prepare an empty space. Then, a liquid crystal was injected into the empty cells to prepare a liquid crystal alignment cell.

1) Voltage Holding Ratio (VHR)

For the liquid crystal alignment cells, the voltage holding ratio was measured at 1 Hz and 60° C. using 6254C equipment available from TOYO Corporation as a measuring instrument.

2. Film Strength

The alignment films obtained from the liquid crystal aligning agent compositions prepared in the examples and comparative examples were subjected to rubbing treatment while rotating the surface of the alignment film at 850 rpm using a rubbing machine (SHINDO Engineering), and then the haze value was measured using a hazemeter. The difference between the haze value after rubbing treatment and the haze value before rubbing treatment was calculated as shown in the following Equation 1 to evaluate the film strength. If the change in haze values is less than 1, it was evaluated that the film strength is excellent.

Film strength (%)=Haze of the liquid crystal alignment film after rubbing treatment (%)−Haze of the liquid crystal alignment film before rubbing treatment (%) [Equation 1]

3) Imidization Conversion Rate (%)

The FT-IR spectra of the liquid crystal alignment films obtained from the liquid crystal aligning agent compositions of the examples and comparative examples were measured by an ATR method, and the ratio of imide structure in the polymer molecules contained in the alignment film was measured.

TABLE 1

| Category | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| VHR (%) | 62 | 74 | 82 | 65 | 75 | 84 | 52 | 81 | 79 |
| Film strength | 0.98 | 0.57 | 0.23 | 0.85 | 0.35 | 0.22 | 13.27 | 0.92 | 0.94 |
| Imidization rate (%) | 98 | 98 | 97 | 98 | 98 | 97 | 92 | 93 | 95 |

Measurement Results of Experimental Example for Examples and Comparative Examples As shown in Table 1, in the case of the liquid crystal alignment cells of the examples obtained by using the polymers synthesized from the diamines having specific structures obtained in Preparation Examples 1 to 3, it was confirmed that the alignment and after-image properties are excellent, the voltage holding ratio (VHR) is as high as 60% or more, and simultaneously the film strength is 1.0 or less, thereby realizing excellent electrical characteristics and durability.

In contrast, it was confirmed that since the liquid crystal aligning agent of Comparative Example 1 does not contain a crosslinking agent such as XR-5517, the film strength is 13.27, which is greatly increased compared to the examples, and the durability is poor.

Meanwhile, it was confirmed that since the liquid crystal aligning agents of Comparative Examples 2 and 3 do not contain the diamine having the structure shown in Preparation Examples 1 to 3, the imidization rate is relatively low at 230° C. compared to the examples.

The invention claimed is:
1. A liquid crystal aligning agent composition comprising:
   a polymer including a repeating unit represented by the following Chemical Formula 1, or a repeating unit represented by the following Chemical Formula 2; and
   a polycarbodiimide compound represented by the following Chemical Formula 5:

[Chemical Formula 1]

[Chemical Formula 2]

wherein, in Chemical Formulas 1 and 2,
at least one of $R_1$ and $R_2$ is an alkyl group having 1 to 10 carbon atoms and the other is hydrogen,
$X_1$ and $X_2$ are each a tetravalent organic group represented by the following Chemical Formula 3,

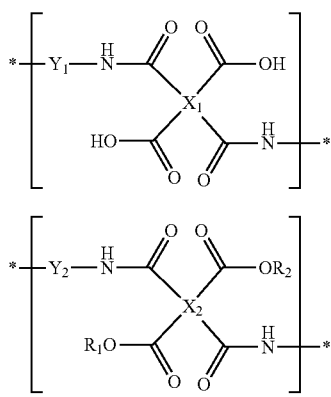

[Chemical Formula 3]

wherein, in Chemical Formula 3,
$R_3$ to $R_8$ are each independently hydrogen or an alkyl group having 1 to 6 carbon atoms,
$L_1$ is any one selected from a single bond, —O—, —CO—, —COO—, —S—, —SO—, —SO$_2$—, —CR$_9$R$_{10}$—, —(CH$_2$)$_Z$—, —O(CH$_2$)$_Z$O—, —COO(CH$_2$)$_Z$OCO—, —CONH—, phenylene, or a combination thereof, where $R_9$ and $R_{10}$ are each independently hydrogen, an alkyl group having 1 to 10 carbon atoms, or a fluoroalkyl group, Z is an integer of 1 to 10, $Y_1$ and $Y_2$ are each independently a divalent organic group represented by the following Chemical Formula 4,

[Chemical Formula 4]

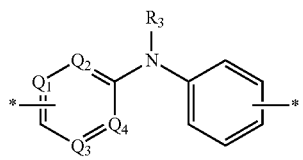

wherein, in Chemical Formula 4, at least one of $Q_1$ to $Q_4$ is a nitrogen atom and each of the rest is a carbon atom, $R_3$ is hydrogen or an alkyl group having 1 to 6 carbon atoms,

[Chemical Formula 5]

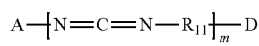

wherein, in Chemical Formula 5,

A is an organic group including —O—, —CO—, —S—, —C(CH$_3$)$_2$—, —C(CF$_3$)$_2$—, —CONH—, —COO—, —(CH$_2$)$_b$—, —O(CH$_2$)$_b$O—, —COO—(CH$_2$)$_b$—OCO—, a urethane-based functional group or a urea-based functional group, b is an integer of 1 to 10, $R_{11}$ is an alkylene group having 1 to 20 carbon atoms or an arylene group having 6 to 20 carbon atoms, m is an integer of 1 to 5, D is a functional group represented by the following Chemical Formula 6,

[Chemical Formula 6]

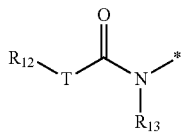

wherein, in Chemical Formula 6,

T is —O— or —NH—, $R_{12}$ is hydrogen, a halogen, an alkyl group having 1 to 6 carbon atoms, an aryl group having 6 to 20 carbon atoms, or an ether group, and when T is oxygen $R_{12}$ is not a halogen, and $R_{13}$ is hydrogen or an alkyl group having 1 to 6 carbon atoms.

2. The liquid crystal aligning agent composition of claim 1, wherein in the functional group represented by Chemical Formula 6, T is —O—, $R_{12}$ is an ether group of the following Chemical Formula 6-1, and $R_{13}$ is hydrogen,

[Chemical Formula 6-1]

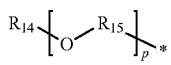

wherein, in Chemical Formula 6-1, $R_{10}$ is hydrogen or an alkyl group having 1 to 6 carbon atoms, $R_{15}$ is an alkylene group having 1 to 6 carbon atoms, and p is an integer of 1 or more.

3. The liquid crystal aligning agent composition of claim 1, wherein in the functional group represented by Chemical Formula 6, T is —NH—, $R_{12}$ is hydrogen, a halogen, an alkyl group having 1 to 6 carbon atoms, or an aryl group having 6 to 20 carbon atoms, and $R_{13}$ is hydrogen.

4. The liquid crystal aligning agent composition of claim 1, wherein the polycarbodiimide compound represented by Chemical Formula 5 is contained in an amount of 0.5 wt % to 15 wt % based on the total weight of the liquid crystal aligning agent composition.

5. The liquid crystal aligning agent composition of claim 1, wherein the polymer further includes a repeating unit represented by the following Chemical Formula 7 or 8:

[Chemical Formula 7]

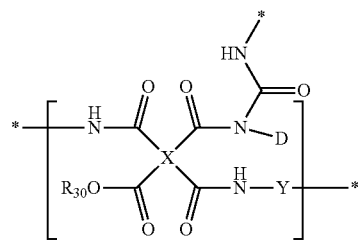

[Chemical Formula 8]

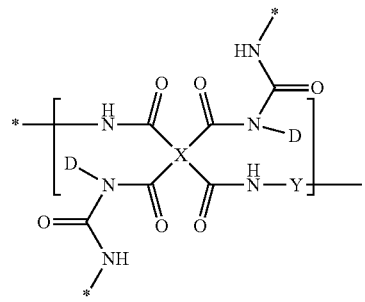

wherein, in Chemical Formula 7 and 8, X is $X_1$ or $X_2$ as defined in claim 1, Y is $Y_1$ or $Y_2$ as defined in claim 1, $R_{30}$ is hydrogen or an alkyl group having 1 to 10 carbon atoms, and D is as defined in claim 1.

6. The liquid crystal aligning agent composition of claim 5, wherein the repeating unit represented by Chemical Formula 7 or 8 is contained in an amount of 0.1 mol % to 20 mol % based on the mole number of the repeating unit represented by Chemical Formula 1 or 2.

7. The liquid crystal aligning agent composition of claim 1, wherein in $Q_1$ to $Q_4$ of Chemical Formula 4, one of $Q_2$ and $Q_4$ is nitrogen and the other is carbon, and $Q_1$ and $Q_3$ are carbon.

8. The liquid crystal aligning agent composition of claim 1, wherein in $Q_1$ to $Q_4$ of Chemical Formula 4, $Q_2$ is nitrogen, and $Q_1$, $Q_3$, and $Q_4$ are carbon.

9. The liquid crystal aligning agent composition of claim 1, wherein in Chemical Formula 4, $R_3$ is hydrogen.

10. The liquid crystal aligning agent composition of claim 1, wherein Chemical Formula 4 includes functional groups represented by the following Chemical Formulas 4-1 to 4-3:

[Chemical Formula 4-1]

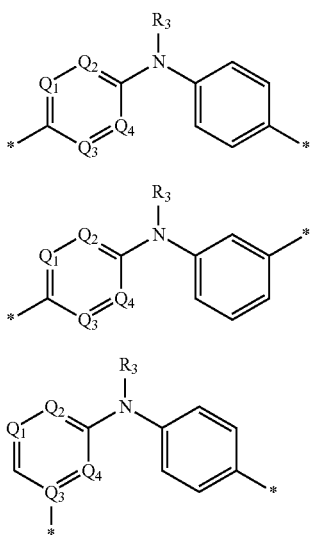

[Chemical Formula 4-2]

[Chemical Formula 4-3]

wherein, in Chemical Formulas 4-1 to 4-3, $Q_1$ to $Q_4$ and $R_3$ are as defined in claim 1.

11. A method for preparing a liquid crystal alignment film comprising the steps of:
coating the liquid crystal aligning agent composition of claim 1 onto a substrate to form a coating film;
drying the coating film;
irradiating the coating film immediately after drying with light or rubbing the coating film to obtain an alignment-treated coating film; and
heat-treating and curing the alignment-treated coating film.

12. The method for preparing a liquid crystal alignment film of claim 11, wherein the liquid crystal aligning agent composition is dissolved or dispersed in an organic solvent.

13. The method for preparing a liquid crystal alignment film of claim 11, wherein the step of drying the coating film is performed at 50° C. to 150° C.

14. The method for preparing a liquid crystal alignment film of claim 11, wherein in the alignment treatment step, the light irradiation is performed by irradiating polarized ultraviolet rays having a wavelength of 150 nm to 450 nm.

15. The method for preparing a liquid crystal alignment film of claim 11, wherein in the step of curing the coating film, the heat treatment temperature is 150° C. to 300° C.

16. A liquid crystal alignment film comprising an aligned cured product of the liquid crystal aligning agent composition of claim 1.

17. A liquid crystal display device comprising the liquid crystal alignment film of claim 16.

18. The liquid crystal aligning agent composition of claim 1, wherein, in Chemical Formula 5, the functional group represented by A is a functional group represented by the following Chemical Formula 21 or a functional group represented by the following Chemical Formula 22:

—R'-G$_1$   [Chemical Formula 21]

in Chemical Formula 21, R' is a divalent organic functional group, and $G_1$ is a functional group of the following Chemical Formula 6 in which T is —O—, $R_{12}$ is an ether group of the following Chemical Formula 6-1, and $R_{13}$ is hydrogen,

[Chemical Formula 6]

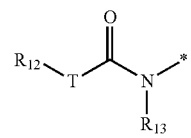

[Chemical Formula 6-1]

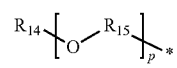

in Chemical Formula 6-1, $R_{14}$ is hydrogen or an alkyl group having 1 to 6 carbon atoms, $R_{15}$ is an alkylene group having 1 to 6 carbon atoms, and p is an integer of 1 to 5,

[Chemical Formula 22]

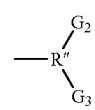

in Chemical Formula 22, R" is a trivalent organic functional group, and $G_2$ is a functional group of the following Chemical Formula 6 in which T is —O—, $R_{12}$ is an ether group of the following Chemical Formula 6-1, and $R_{13}$ is hydrogen,

[Chemical Formula 6]

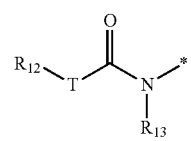

[Chemical Formula 6-1]

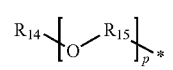

in Chemical Formula 6-1, $R_{14}$ is hydrogen or an alkyl group having 1 to 6 carbon atoms, $R_{15}$ is an alkylene group having 1 to 6 carbon atoms, and p is an integer of 1 to 5, $G_3$ is a functional group of the Chemical Formula 6 in which T is —NH—, $R_{12}$ is hydrogen, a halogen, an alkyl group having 1 to 6 carbon atoms, or an aryl group having 6 to 20 carbon atoms, and $R_{13}$ is hydrogen.

* * * * *